(12) United States Patent
Hase

(10) Patent No.: US 7,077,583 B2
(45) Date of Patent: Jul. 18, 2006

(54) BARRIER DEVICE

(75) Inventor: Hiroyuki Hase, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 95 days.

(21) Appl. No.: 10/928,453

(22) Filed: Aug. 27, 2004

(65) Prior Publication Data

US 2005/0053372 A1    Mar. 10, 2005

(30) Foreign Application Priority Data

Sep. 10, 2003   (JP)   ............................. 2003-317784

(51) Int. Cl.
*G03B 11/04* (2006.01)
*G02B 23/16* (2006.01)

(52) U.S. Cl. ...................................... 396/448; 359/511
(58) Field of Classification Search ................. 396/448; 359/507, 508, 511
See application file for complete search history.

(56) References Cited

U.S. PATENT DOCUMENTS 5,602,607 A * 2/1997 Kato et al. .................. 396/349
5,892,998 A * 4/1999 Kodaira et al. ............. 396/448
6,419,407 B1 * 7/2002 Nakazawa ................... 396/448
6,663,300 B1 * 12/2003 Nagae ......................... 396/448

FOREIGN PATENT DOCUMENTS

JP      07-159856 A    6/1995

\* cited by examiner

*Primary Examiner*—W. B. Perkey
*Assistant Examiner*—Rishi Suthar
(74) *Attorney, Agent, or Firm*—Canon U.S.A. Inc IP Division

(57) ABSTRACT

A barrier device for covering and uncovering a front face of an optical system. The barrier device includes a rotating barrel supporting the optical system at an opening and rotatable about an axis, a barrier member that is movable by the rotation of the rotating barrel between a closed position covering the front face of an optical system and an open position uncovering the front face of the optical system, and an elastic member supported by the barrier member and coupled to the rotating barrel so as to transmit a rotational force of the rotating barrel to the barrier member. Accordingly, the number of dedicated parts for opening and closing the barrier member can be reduced, thereby attaining a reduction in cost and a reduction in configuration space. Further, the barrier device can be reduced in size.

9 Claims, 18 Drawing Sheets

BARRIER DEVICE

CROSS-REFERENCE TO RELATED APPLICATIONS

This application claims the benefit of Japanese Application 2003-317784, filed Sep. 10, 2003, the entire contents of which are incorporated by reference herein.

BACKGROUND OF THE INVENTION

1. Field of the Invention

The present invention relates to an openable and closable barrier device disposed in front of an optical system to protect the optical system.

2. Description of Related Art

A conventional barrier device disclosed, for example, in Japanese Laid-Open Patent Application No. Hei 7-159856 is composed of two barrier blades, a barrier driving ring, barrier springs, a barrier-driving-ring spring, and a connection shaft. The two barrier blades are arranged to cover the front of a photo-taking optical system. The barrier driving ring rotates around an optical axis of the photo-taking optical system to drive the barrier blades to open and close. Each of the barrier springs is mounted between the barrier blade and the barrier driving ring to constantly bring the barrier blade into contact with the barrier driving ring and to urge the barrier blade in the direction of closing, and absorbs a relief movement of the barrier driving ring relative to the barrier blade. The barrier-driving-ring spring is mounted between the barrier driving ring and a lens-barrel cover to urge the barrier driving ring counterclockwise and to drive the barrier blade in the direction of opening. The connection shaft is arranged to transmit the rotational movement of a rotating barrel (member) to the barrier driving ring.

Operation of the conventional barrier device configured as described above is briefly described. When the rotating barrel rotates clockwise, the rotational movement of the rotating barrel is transmitted to the barrier driving ring via the connection shaft. The barrier driving ring then rotates clockwise while charging the barrier-driving-ring spring, so that the barrier blades rotate counterclockwise following the rotation of the barrier driving ring. This rotation results in the barrier blades covering the front of the photo-taking optical system. On the other hand, when the rotating barrel rotates counterclockwise, a contact portion between the rotating barrel and the connection shaft comes into a free state. The barrier driving ring then rotates counterclockwise under the spring force of the barrier-driving-ring spring, which has been in the charged state, so that the barrier blades rotate clockwise following the rotation of the barrier driving ring. This rotation results in the barrier blades uncovering the front of the photo-taking optical system.

In cases where some obstacles (for example, foreign matter such as sand) prevent the barrier blades from rotating in the direction of closing in the process of closing operation, the barrier springs allow the barrier driving ring to rotate clockwise, while being charged by the clockwise rotation of the barrier driving ring. In other words, the barrier springs allow a relief movement of the barrier driving ring relative to the barrier blades. This leads to prevention of occurrence of any mechanical failure.

However, there are problems associated with the conventional barrier device as follows. The conventional barrier device necessitates an increased number of parts and a relatively high cost because dedicated parts for driving the barrier blades to open and close (i.e., the barrier driving ring and the barrier-driving-ring spring) and dedicated parts for absorbing a relief movement of the barrier driving ring relative to the barrier blades when some obstacles (for example, foreign matter such as sand) prevent the barrier blades from rotating in the direction of closing in the process of closing operation (i.e., the barrier springs) are required. In addition, the whole lens barrel increases in size because such dedicated parts require a relatively large configuration space.

Furthermore, there is another problem with the conventional barrier device in that, since both the barrier-driving-ring spring, which drives the barrier driving ring, and the barrier springs, which absorb a relief movement of the barrier driving ring relative to the barrier blades, are required, a load on operation of the lens barrel occurring at the time of the closing operation of the barrier blades increases, if these springs are configured with a balancing of spring forces taken into consideration in view of measures against possible obstacles.

SUMMARY OF THE INVENTION

The present invention is directed to a barrier device having a barrier member and an apparatus incorporating the same in which dedicated parts for opening and closing the barrier member are reduced, and a configuration space for such dedicated parts is minimized. In one aspect of the present invention, the barrier device includes a rotating barrel having an opening and an inner circumferential surface, wherein the rotating barrel is rotatable about an axis, a barrier member movably positioned about the opening of the rotating barrel, and an elastic member supported by the barrier member and coupled to the rotating barrel so as to transmit a rotational force of the rotating barrel to the barrier member to move the barrier member between a first position and a second position.

With the barrier device configured as described above, the rotating barrel directly drives the elastic member to move the barrier member. Accordingly, the number of dedicated parts for moving the barrier member is reduced, and a configuration space for such dedicated parts is minimized.

In one embodiment, the elastic member includes first and second elastic transmission arms and the barrier member includes a protruding member capable of moving the first and second elastic transmission arms apart from each other to produce an elastic force urging the first and second elastic transmission arms together to move the barrier member.

In another embodiment, the barrier member includes an action portion, wherein as the rotating barrel rotates, the action portion contacts one of the cam portions to move the barrier member.

The above and further features and advantages of the present invention will become apparent to those skilled in the art upon reading of the following detailed description of embodiments thereof when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE EMBODIMENTS

Embodiments of the invention will be described in detail below with reference to the drawings.

First Embodiment

Figure 1:
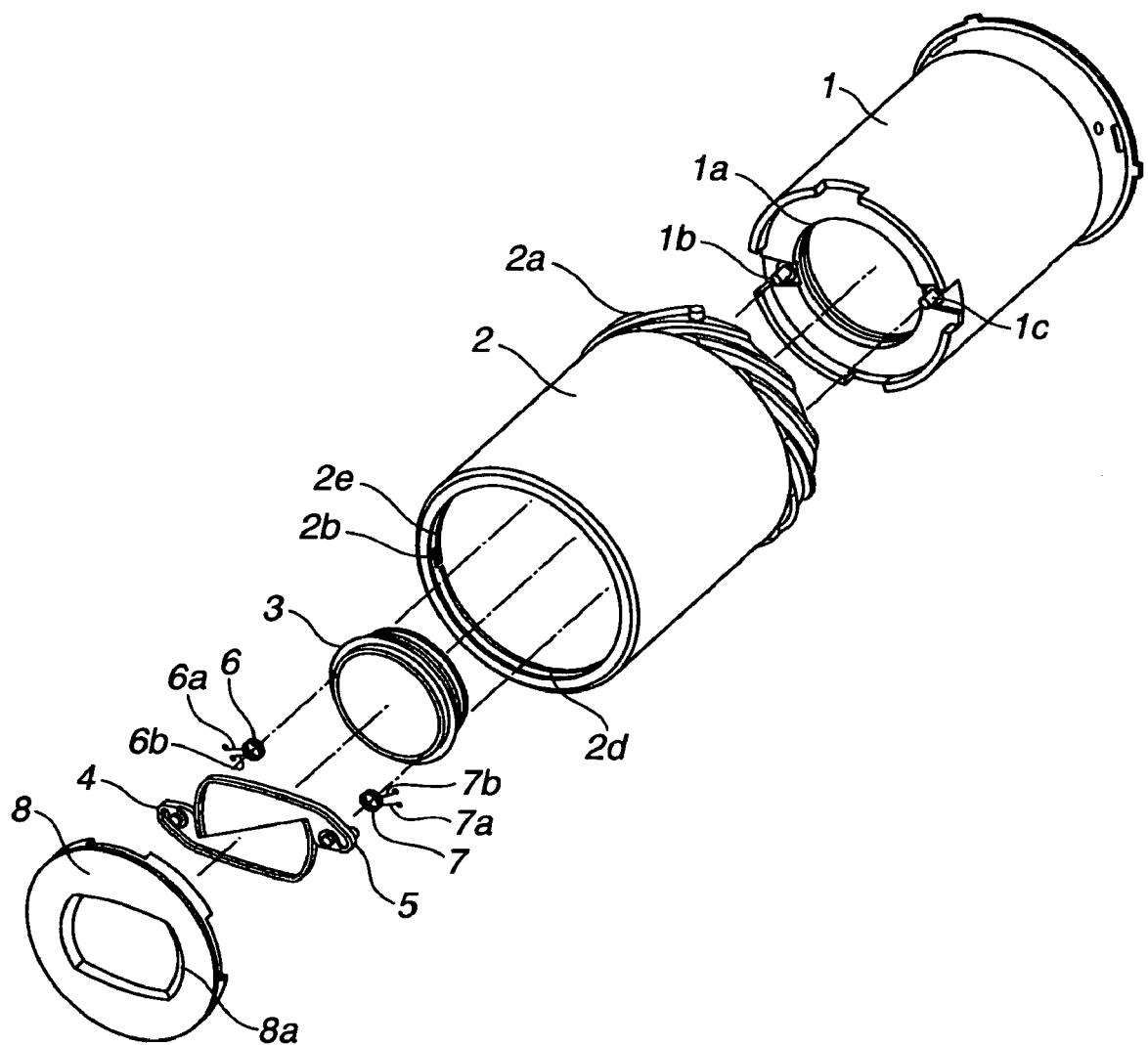
FIG. 1 is an exploded perspective view showing the components of a barrier device according to a first embodiment of the invention.
Figure 2:
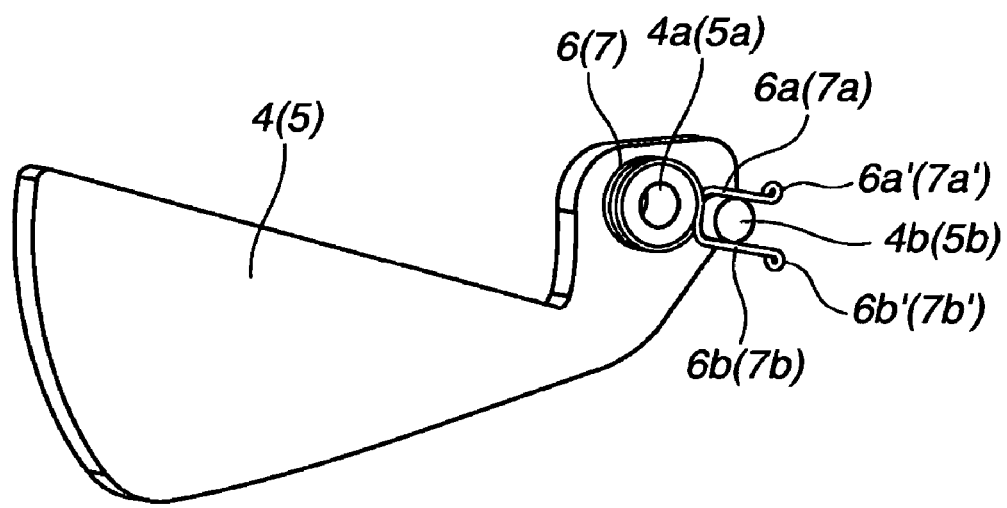
FIG. 2 is a rear perspective view showing a barrier blade with a barrier spring incorporated therein in the first embodiment of the invention.
Figure 3:
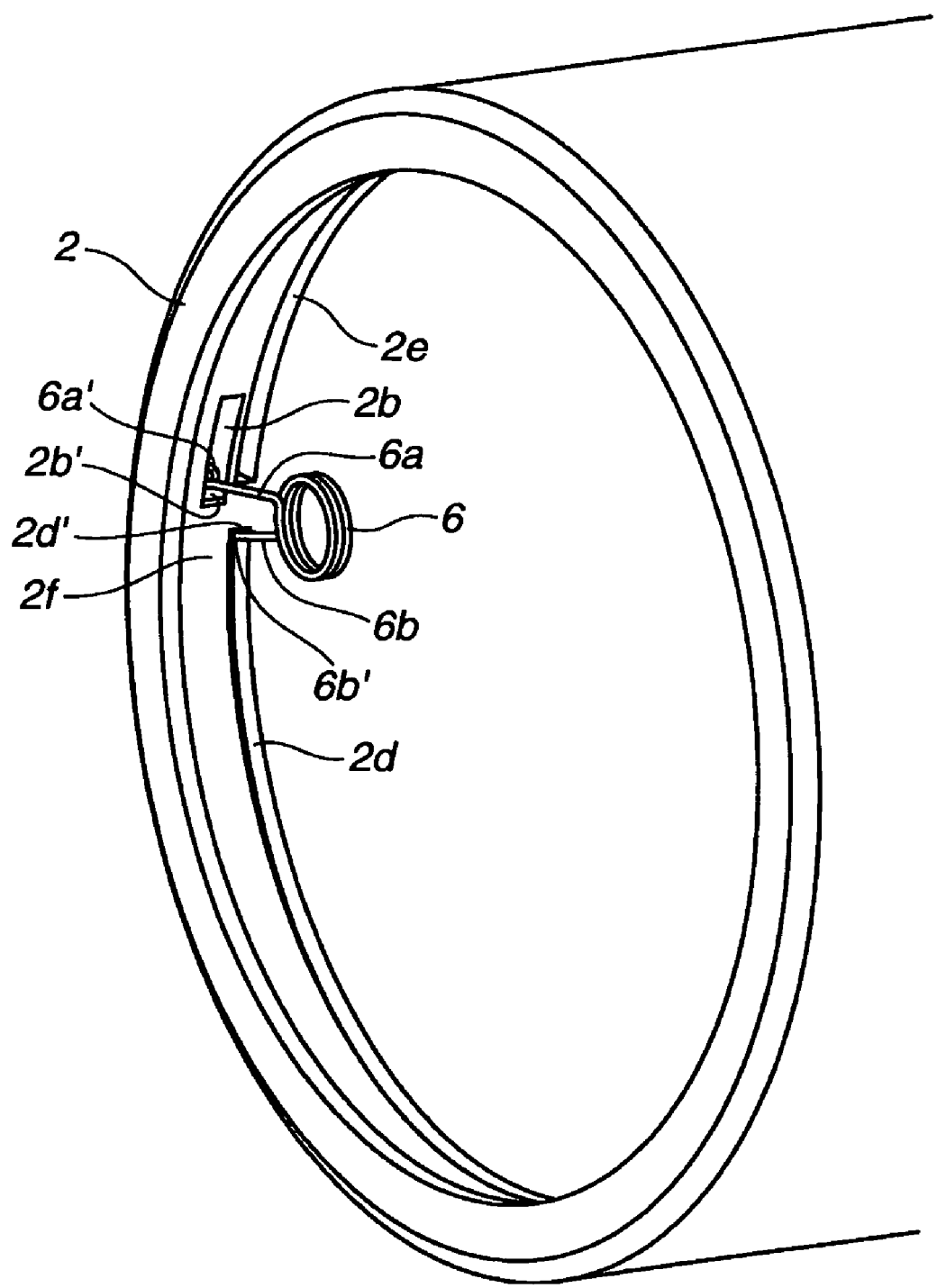
FIG. 3 is a perspective view showing the relationship between a rotating barrel and a barrier spring in the first embodiment of the invention.

The components of a barrier device according to a first embodiment of the invention are described first with reference to FIGS. 1 to 3. Referring to these figures, a rectilinear-motion barrel 1 is fitted into and supported by the inner circumferential surface of a rotating barrel 2. The rotating barrel 2 is supported by a second rectilinear-motion barrel (not shown) via a helicoid screw-thread 2a formed at the rear portion of the rotating barrel 2 engaging with a helicoid screw-thread formed on the second rectilinear-motion barrel. The rotating barrel 2, when rotating around the rectilinear-motion barrel 1, moves backward and forward integrally with the rectilinear-motion barrel 1 in an optical axis direction along the lead of the helicoid screw-thread of the second rectilinear-motion barrel. The rectilinear-motion barrel 1 has an opening portion 1a configured to support a photo-taking optical system 3, and supporting shafts 1b and 1c configured to support barrier blades 4 and 5, respectively. The rotating barrel 2 has, on its inner circumferential surface, a first cam groove 2b for driving the barrier blade 4 in the direction of opening, a second cam groove 2d for driving the barrier blade 4 in the direction of closing, a first cam groove 2c (not shown in FIGS. 1 to 3; see FIG. 4) for driving the barrier blade 5 in the direction of opening, and a second cam groove 2e for driving the barrier blade 5 in the direction of closing. The positions of the first cam grooves 2b and 2c on the inner circumferential surface are different from the positions of the second cam grooves 2d and 2e. As viewed in a direction perpendicular to the direction of opening or closing of the barrier blades 4 and 5, i.e., as viewed in the optical axis direction, the second cam grooves 2d and 2e are positioned deeper into the rotating barrel 2 relative to the first cam grooves 2b and 2c.

The barrier blades 4 and 5 are movable for opening and closing between a fully closed position to cover the front face of the photo-taking optical system 3 and a fully open position to uncover that front face. The barrier blade 4 is fitted on and supported by the supporting shaft 1b of the rectilinear-motion barrel 1 and is rotatable in a direction perpendicular to the optical axis direction. The barrier blade 5 is also fitted on and supported by the supporting shaft 1c of the rectilinear-motion barrel 1 and is rotatable in a direction perpendicular to the optical axis direction.

Barrier springs 6 and 7 are coil springs configured to drive the barrier blades 4 and 5, respectively, for opening and closing. The barrier springs 6 and 7 are arranged to allow a relief movement of the rotating barrel 2 relative to the barrier blades 4 and 5 if one or both of the barrier blades 4 and 5 are prevented by some obstacle (for example, foreign matter such as sand) from rotating in the direction of opening or closing in the middle of an opening or closing operation. The barrier spring 6 is supported by a rotation center portion 4a of the barrier blade 4, as shown in FIG. 2, and has two elastic transmission arms 6a and 6b extending radially from the rotation center portion 4a. A protruding portion 4b formed on the barrier blade 4 is sandwiched between the two elastic transmission arms 6a and 6b, so that the barrier blade 4 and the barrier spring 6 can rotate integrally. As shown in FIG. 3, the elastic transmission arm 6a is inserted in the first cam groove 2b of the rotating barrel 2, and the other elastic transmission arm 6b is inserted in the second cam groove 2d of the rotating barrel 2. Similarly, the barrier spring 7 is supported by a rotation center portion 5a of the barrier blade 5, as shown in FIG. 2, and has two elastic transmission arms 7a and 7b extending radially from the rotation center portion 5a. A protruding portion 5b formed on the barrier blade 5 is sandwiched between the two elastic transmission arms 7a and 7b, so that the barrier blade 5 and the barrier spring 7 can rotate integrally. Similarly to the barrier spring 6 shown in FIG. 3, the elastic transmission arm 7a is inserted in the first cam groove 2c of the rotating barrel 2, and the other elastic transmission arm 7b is inserted in the second cam groove 2e of the rotating barrel 2.

A barrier cover 8 holds the barrier blades 4 and 5 on the rectilinear-motion barrel 1, and is disposed in front of the barrier blades 4 and 5 and fixed to the rectilinear-motion barrel 1. The barrier cover 8 has an opening portion 8a corresponding to the photo-taking optical system 3. The opening portion 8a is allowed to be covered by the barrier blades 4 and 5.

Opening and closing operations of the barrier device are described next with reference to FIGS. 4 to 10.

Figure 4:
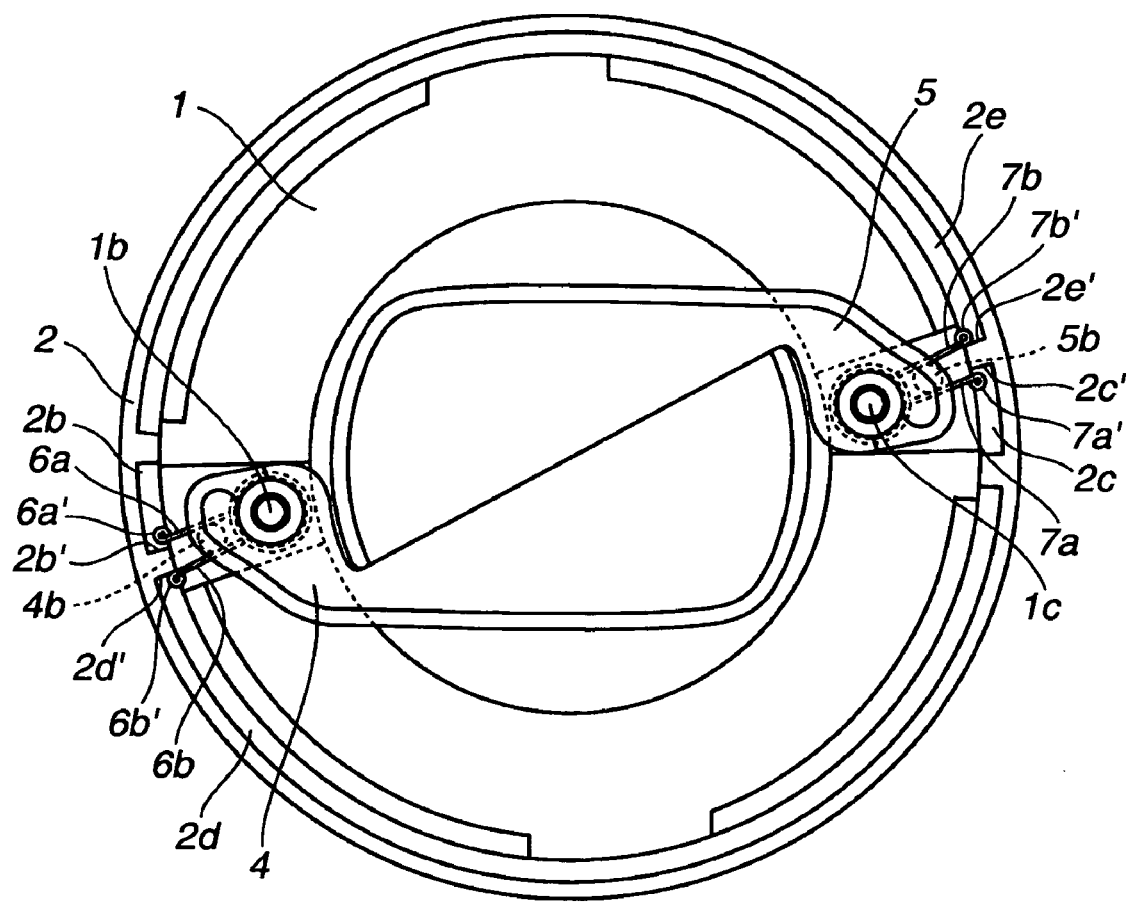
FIG. 4 is a front elevational view of the barrier device with barrier blades in a fully closed state in the first embodiment of the invention.
Figure 5:
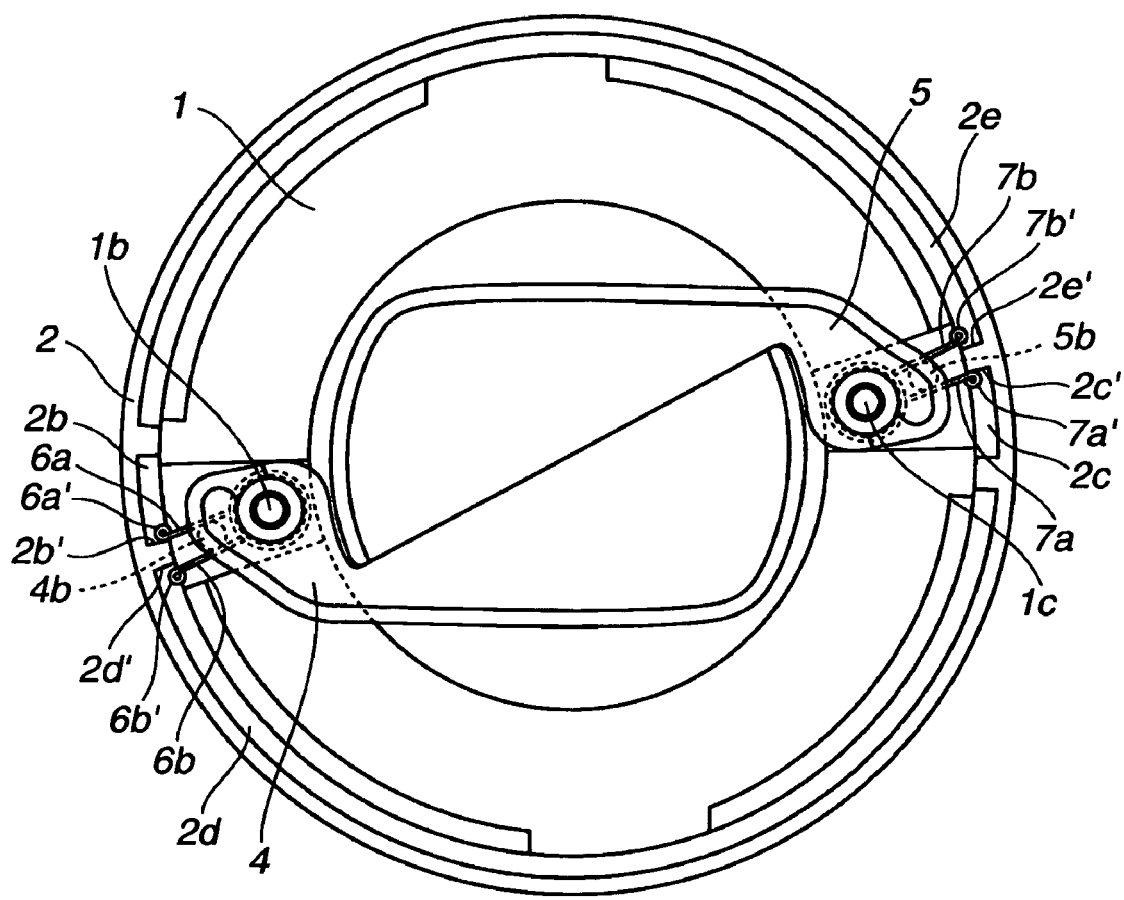
FIG. 5 is a front elevational view of the barrier deice with the barrier blades beginning to open in the first embodiment of the invention.

(i) Driving of the barrier blades 4 and 5 for a fully open state:

When a main switch of the camera (not shown) is switched to an ON mode, a motor (not shown) is driven. This driving of the motor causes the rotating barrel 2 to rotate clockwise around the rectilinear-motion barrel 1 from the state shown in FIG. 4. According to the rotation of the rotating barrel 2, as shown in FIG. 5, an end portion 2b' of the first cam groove 2b of the rotating barrel 2 comes into contact with a tip 6a' of the elastic transmission arm 6a of the barrier spring 6, and an end portion 2c' of the first cam groove 2c of the rotating barrel 2 comes into contact with a tip 7a' of the elastic transmission arm 7a of the barrier spring 7. This contact brings the rotating barrel 2 and the barrier springs 6 and 7 into an interlocked state, so that the rotational force of the rotating barrel 2 is transmitted to the barrier springs 6 and 7. Then, the barrier blade 4 and the barrier spring 6 rotate integrally clockwise around the supporting shaft 1b of the rectilinear-motion barrel 1, and the barrier blade 5 and the barrier spring 7 rotate integrally clockwise around the supporting shaft 1c of the rectilinear-motion barrel 1.

Figure 6:
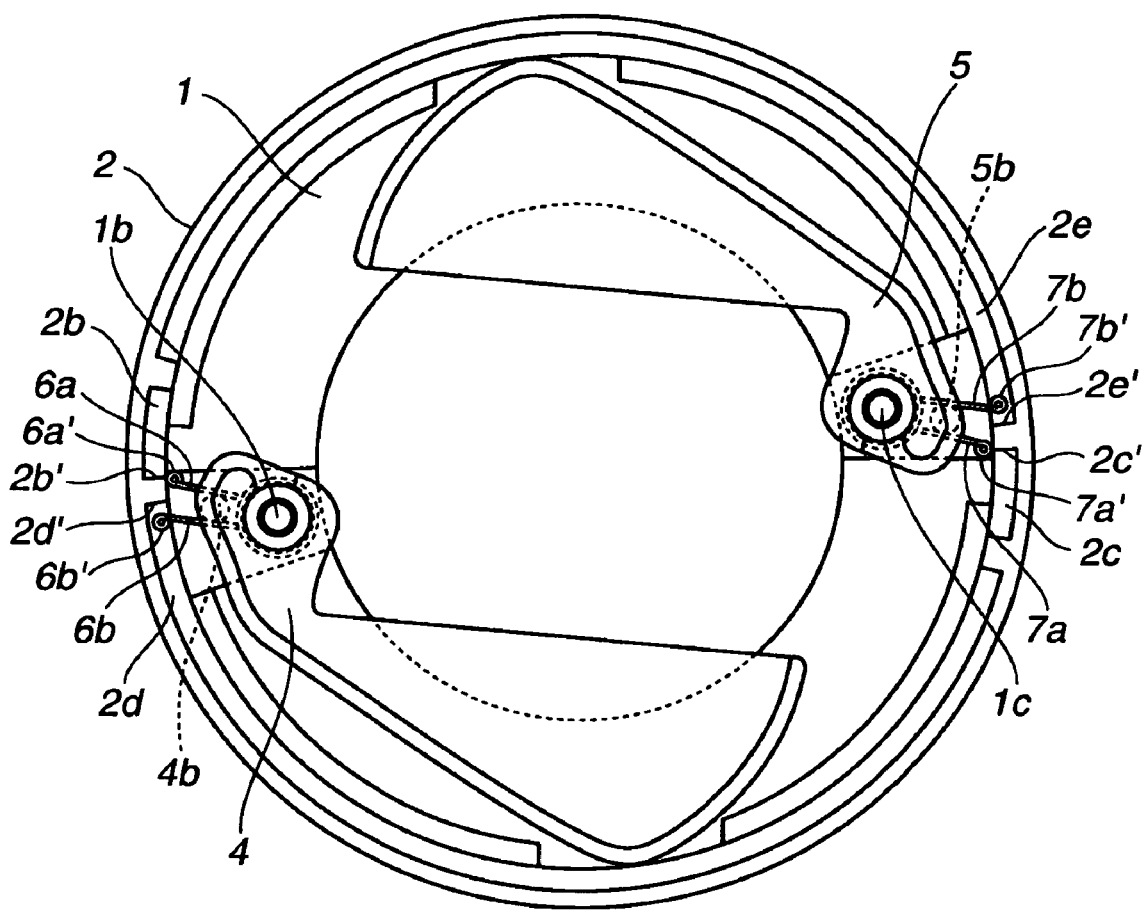
FIG. 6 is a front elevational view of the barrier device with the barrier blades in a fully open state in the first embodiment of the invention.
Figure 7:
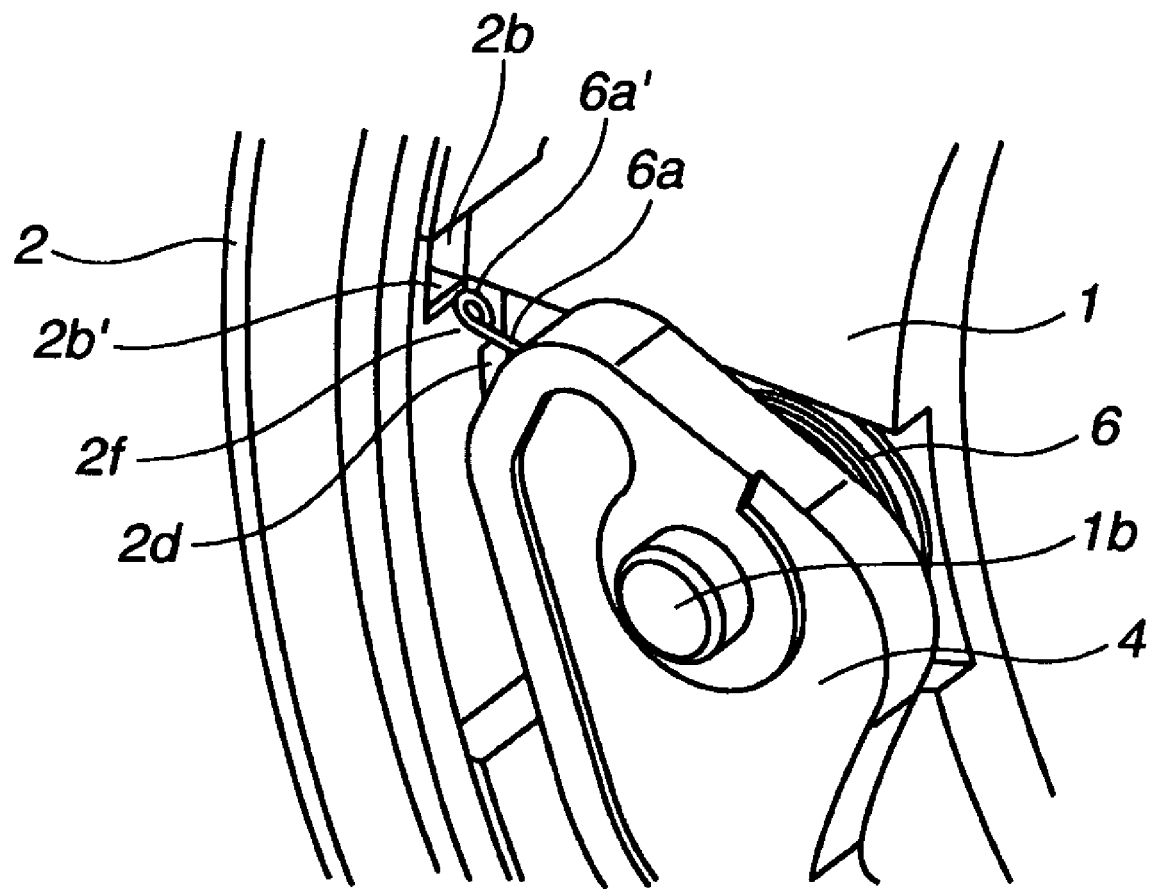
FIG. 7 is a perspective view of a part of the barrier device showing the relationship between the rotating barrel and the barrier spring in the state shown in FIG. 6.
Figure 8:
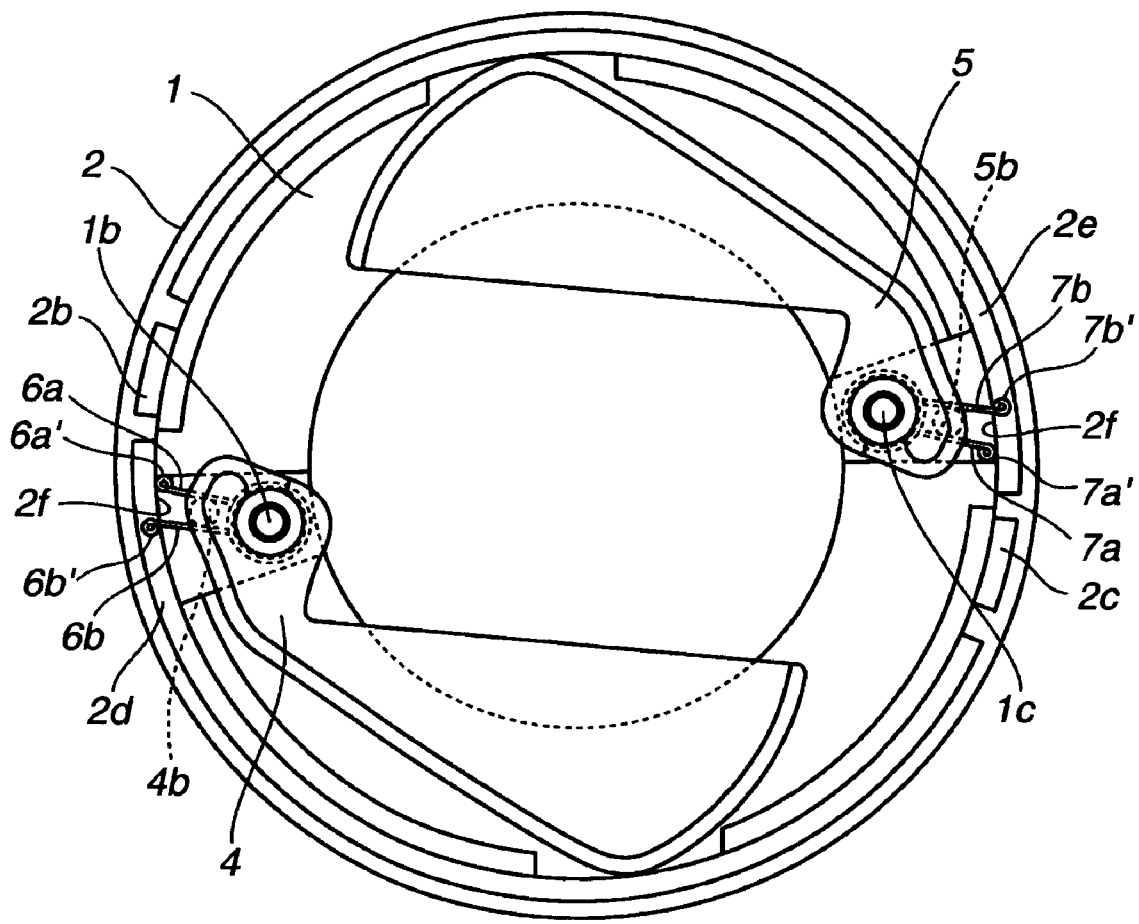
FIG. 8 is a front elevational view of the barrier device in a photo-taking ready state in the first embodiment of the invention.
Figure 9:
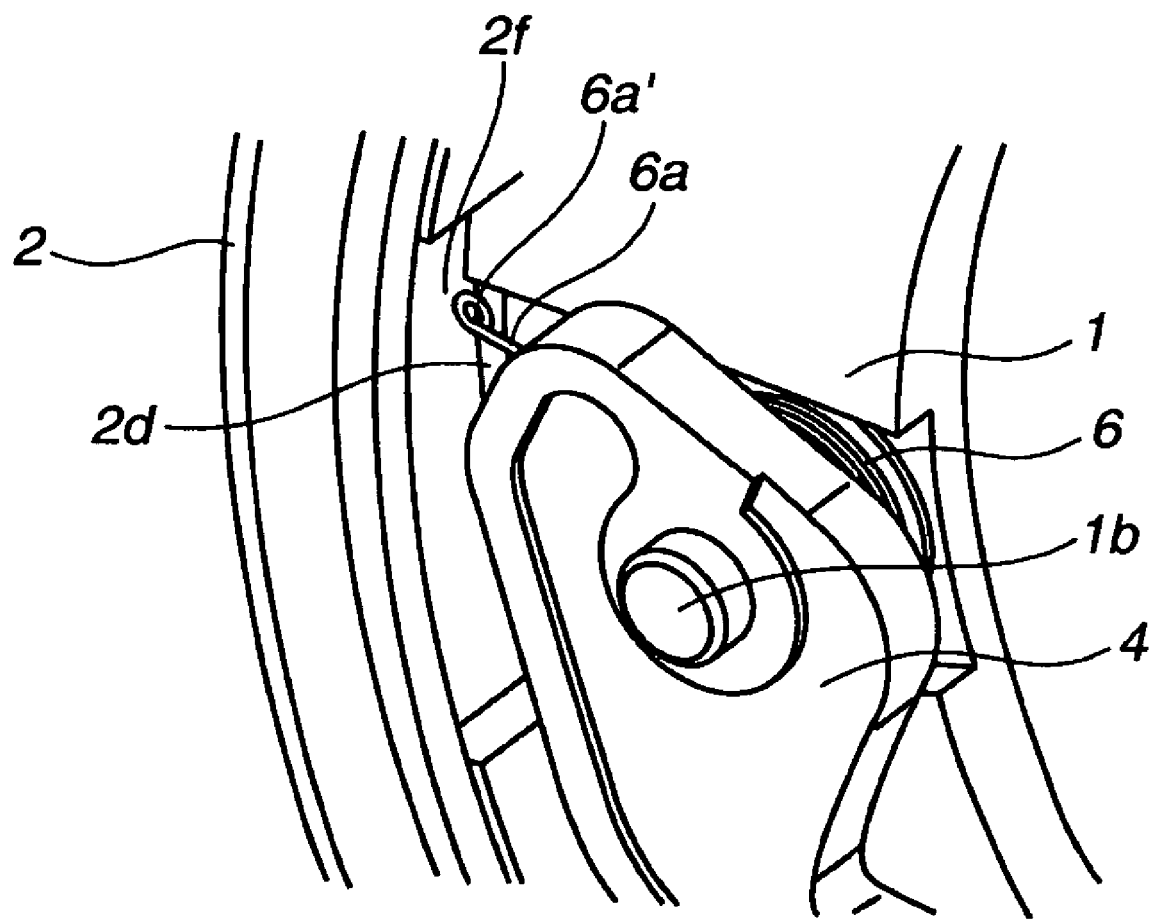
FIG. 9 is a perspective view of a part of the barrier device showing the relationship between the rotating barrel and the barrier spring in the state shown in FIG. 8.

The above clockwise rotation of the barrier blade 4 and the barrier spring 6 and that of the barrier blade 5 and the barrier spring 7 lead to opening operations of the barrier blades 4 and 5. When the barrier blades 4 and 5 reach a fully open state, as shown in FIGS. 6 and 7, the tip 6a' of the elastic transmission arm 6a of the barrier spring 6 withdraws from within the first cam groove 2b of the rotating barrel 2, and the tip 7a' of the elastic transmission arm 7a of the barrier spring 7 withdraws from within the first cam groove 2c of the rotating barrel 2. This withdrawal brings the rotating barrel 2 and the barrier springs 6 and 7 into a non-interlocked state, so that the transmission of the rotational force of the rotating barrel 2 to the barrier springs 6 and 7 is interrupted. Once the tips 6a' and 7a' of the elastic transmission arms 6a and 7a of the barrier springs 6 and 7 have withdrawn from within the first cam grooves 2b and 2c of the rotating barrel 2, the tips 6a' and 7a' of the elastic transmission arms 6a and 7a of the barrier springs 6 and 7 come into contact with an inner circumferential surface 2f of the rotating barrel 2, as shown in FIGS. 8 and 9. Accordingly, the fully open state of the barrier blades 4 and 5 is maintained to bring about a photo-taking ready state.

Incidentally, when the barrier blades 4 and 5 have reached the fully open state, the above motor is brought to a stop.

Figure 10:
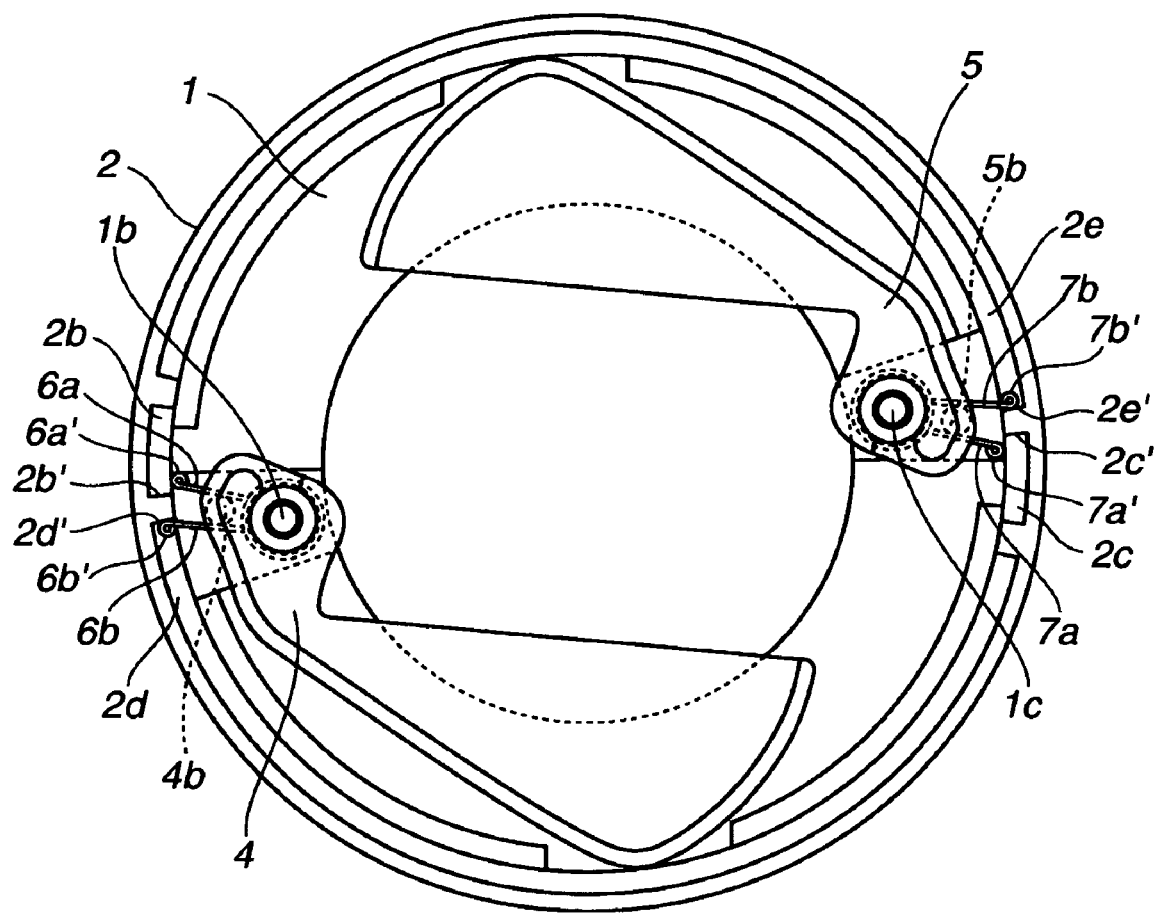
FIG. 10 is a front elevational view of the barrier deice with the barrier blades beginning to close in the first embodiment of the invention.

(ii) Driving of the barrier blades 4 and 5 for a fully closed state:

When the main switch of the camera (not shown) is switched to an OFF mode, the motor (not shown) is driven. This driving of the motor causes the rotating barrel 2 to rotate counterclockwise around the rectilinear-motion barrel 1 from the state shown in FIG. 8. According to the rotation of the rotating barrel 2, as shown in FIG. 10, an end portion 2d' of the second cam groove 2d of the rotating barrel 2 comes into contact with a tip 6b' of the elastic transmission arm 6b of the barrier spring 6, and an end portion 2e' of the second cam groove 2e of the rotating barrel 2 comes into contact with a tip 7b' of the elastic transmission arm 7b of the barrier spring 7. This contact brings the rotating barrel 2 and the barrier springs 6 and 7 into an interlocked state, so that the rotational force of the rotating barrel 2 is transmitted to the barrier springs 6 and 7. Then, since the tips 6a' and 7a' of the elastic transmission arms 6a and 7a of the barrier springs 6 and 7 are freed from contact with the inner circumferential surface 2f of the rotating barrel 2, the barrier blade 4 and the barrier spring 6 rotate integrally counterclockwise around the supporting shaft 1b of the rectilinear-motion barrel 1, and the barrier blade 5 and the barrier spring 7 rotate integrally counterclockwise around the supporting shaft 1c of the rectilinear-motion barrel 1.

The above counterclockwise rotation of the barrier blade 4 and the barrier spring 6 and that of the barrier blade 5 and the barrier spring 7 lead to closing operations of the barrier blades 4 and 5. Then, the barrier blades 4 and 5 reach a fully closed state, as shown in FIG. 4. In the fully closed state, the tip 6a' of the elastic transmission arm 6a of the barrier spring 6 enters the first cam groove 2b of the rotating barrel 2, and the tip 7a' of the elastic transmission arm 7a of the barrier spring 7 enters the first cam groove 2c of the rotating barrel 2.

Incidentally, when the barrier blades 4 and 5 have reached the fully closed state, the above motor is brought to a stop.

When an unfavorable operation on either the barrier blade 4 or 5 is performed by a user during the opening or closing operation of the barrier device, the barrier device operates as described below with reference to FIGS. 4, 8, 11, 12 and 13.

Figure 11:
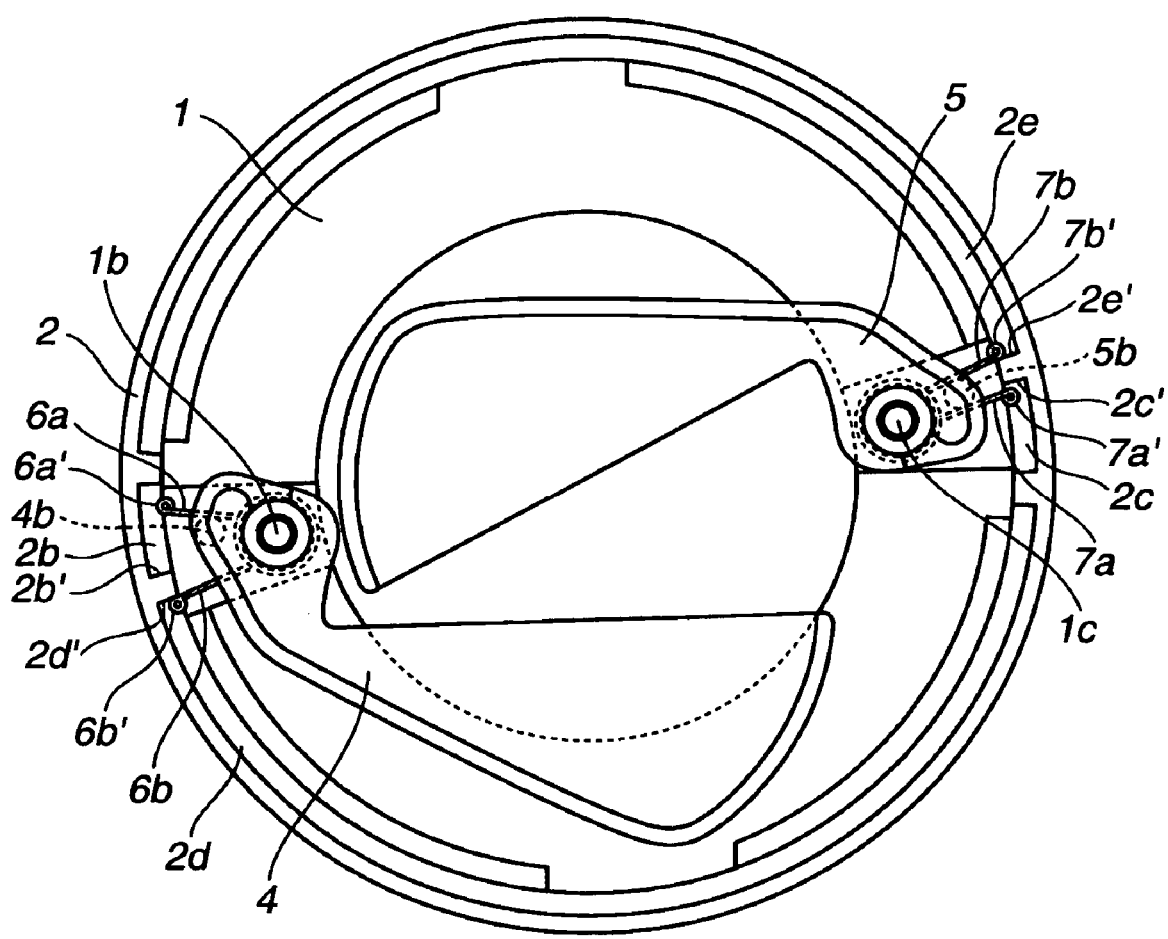
FIG. 11 is a front elevational view of the barrier deice with one of the barrier blades forcibly opened in the first embodiment of the invention.

(i) Forcibly opening the barrier blade 4 or 5 when the barrier blades 4 and 5 are in the fully closed state:

If the user forcibly rotates the barrier blade 4 clockwise as shown in FIG. 11 when the barrier blades 4 and 5 are in the fully closed state shown in FIG. 4, the barrier spring 6 is also about to rotate clockwise integrally with the barrier blade 4. However, since the rotating barrel 2 is not rotated, the elastic transmission arm 6b of the barrier spring 6, which is in contact with the end portion 2d' of the second cam groove 2d of the rotating barrel 2, acts as a stationary arm, and the elastic transmission arm 6a of the barrier spring 6, which is in contact with the protruding portion 4b of the barrier blade 4, acts as a movable arm. Accordingly, the protruding portion 4b of the barrier blade 4 forcibly rotating clockwise causes only the elastic transmission arm 6a of the barrier spring 6 to rotate clockwise, thereby charging the barrier spring 6. In this situation, if the user stops forcibly opening the barrier blade 4, the barrier blade 4 is rotated counterclockwise by the charged spring force of the barrier spring 6 and then returns to the fully closed state as shown in FIG. 4.

Figure 12:
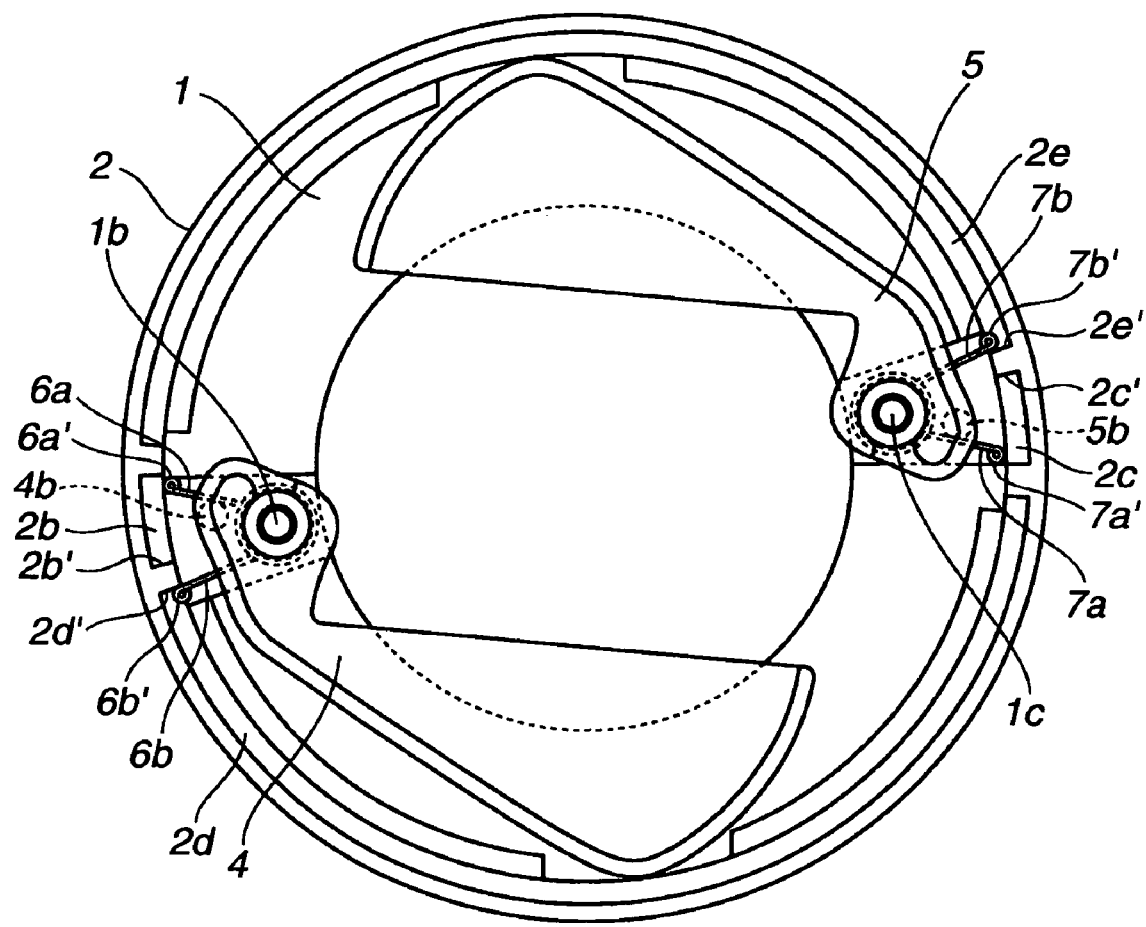
FIG. 12 is a front elevational view of the barrier device with the barrier blades hindered from closing in the first embodiment of the invention.

(ii) Hindering the closing operation of the barrier device:

If the user hinders rotation of the barrier blades 4 and 5 when the barrier blades 4 and 5 are in the process of being closed with the rotating barrel 2 being rotated counterclockwise from the fully open state shown in FIG. 8, the barrier springs 6 and 7, which will rotate following rotation of the rotating barrel 2, are prevented from rotating. Accordingly, as shown in FIG. 12, the elastic transmission arm 6a of the barrier spring 6, which is in contact with the protruding portion 4b of the barrier blade 4, acts as a stationary arm, and the elastic transmission arm 6b of the barrier spring 6, which is in contact with the end portion 2d' of the second cam groove 2d of the rotating barrel 2, acts as a movable arm. Also, the elastic transmission arm 7a of the barrier spring 7, which is in contact with the protruding portion 5b of the barrier blade 5, acts as a stationary arm, and the elastic transmission arm 7b of the barrier spring 7, which is in contact with the end portion 2e' of the second cam groove 2e of the rotating barrel 2, acts as a movable arm. Therefore, the end portions 2d' and 2e' of the second cam grooves 2d and 2e of the rotating barrel 2, with rotation of the barrier blades 4 and 5 hindered, cause only the elastic transmission arms 6b and 7b of the barrier springs 6 and 7 to rotate counterclockwise, thereby charging the barrier springs 6 and 7. In this situation, if the user stops hindering rotation of the barrier blades 4 and 5, the barrier blades 4 and 5 are rotated counterclockwise by the charged spring force of the barrier springs 6 and 7 and then come into the fully closed state as shown in FIG. 4.

Figure 13:
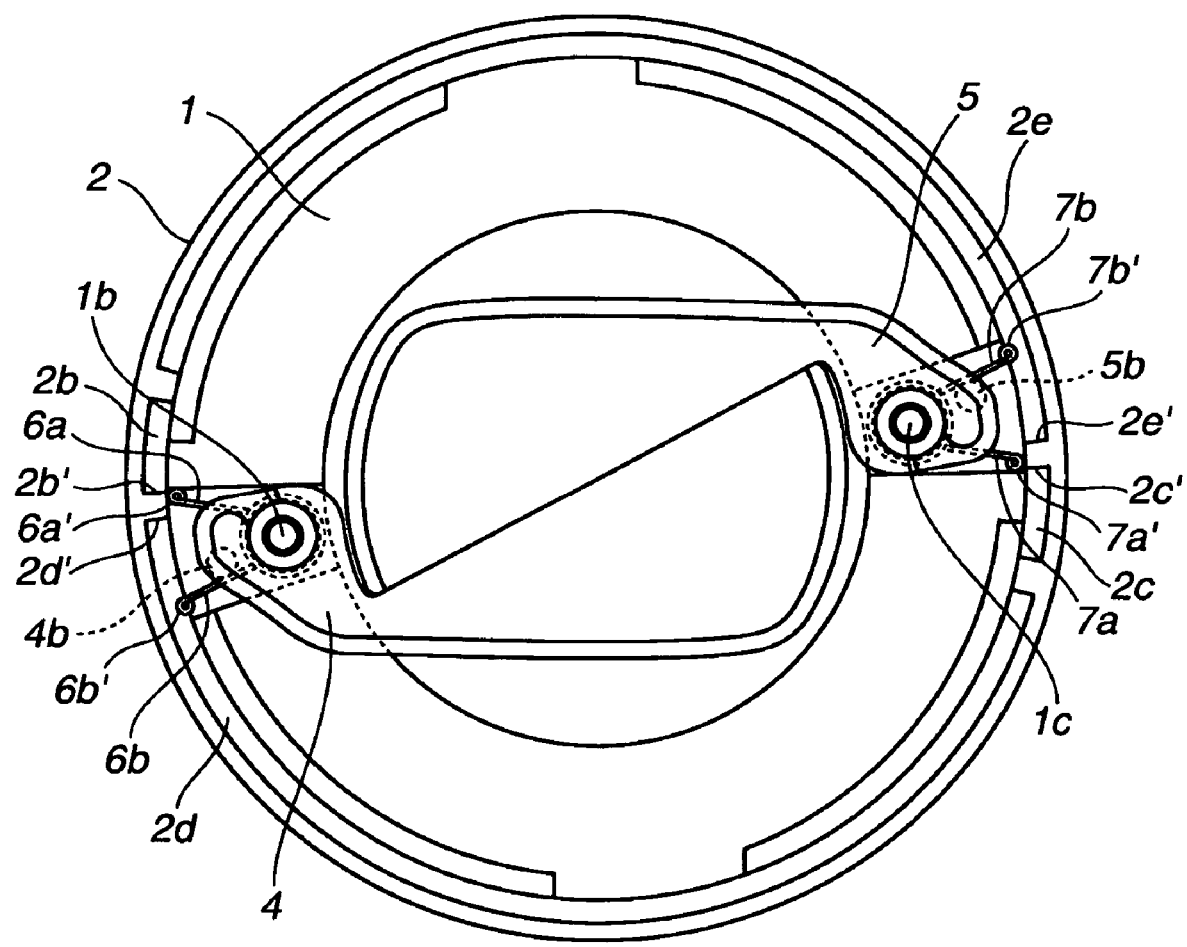
FIG. 13 is a front elevational view of the barrier device with the barrier blades hindered from opening in the first embodiment of the invention.

(iii) Hindering the opening operation of the barrier device:

If the user hinders rotation of the barrier blades 4 and 5 when the barrier blades 4 and 5 are in the process of being opened with the rotating barrel 2 being rotated clockwise from the fully closed state shown in FIG. 4, the barrier springs 6 and 7, which will rotate following rotation of the rotating barrel 2, are prevented from rotating. Accordingly, as shown in FIG. 13, the elastic transmission arm 6b of the barrier spring 6, which is in contact with the protruding portion 4b of the barrier blade 4, acts as a stationary arm, and the elastic transmission arm 6a of the barrier spring 6, which is in contact with the end portion 2b' of the second cam groove 2b of the rotating barrel 2, acts as a movable arm. Also, the elastic transmission arm 7b of the barrier spring 7, which is in contact with the protruding portion 5b of the barrier blade 5, acts as a stationary arm, and the elastic transmission arm 7a of the barrier spring 7, which is in contact with the end portion 2c' of the second cam groove 2c of the rotating barrel 2, acts as a movable arm. Therefore, the end portions 2b' and 2c' of the second cam grooves 2b and 2c of the rotating barrel 2, with rotation of the barrier blades 4 and 5 hindered, cause only the elastic transmission arms 6a and 7a of the barrier springs 6 and 7 to rotate clockwise, thereby charging the barrier springs 6 and 7. In this situation, if the user stops hindering rotation of the barrier blades 4 and 5, the barrier blades 4 and 5 are rotated clockwise by the charged spring force of the barrier springs 6 and 7 and then come into the fully open state as shown in FIG. 8.

According to the first embodiment described above, the rotating barrel 2 directly drives the barrier springs 6 and 7 to perform opening and closing operations of the barrier blades 4 and 5. Accordingly, since the number of dedicated parts for driving each of the barrier blades 4 and 5 is one, cost increases can be prevented. In addition, since a small configuration space suffices for such dedicated parts, the whole lens barrel can be reduced in size.

Furthermore, in cases where some obstacle (foreign matter such as sand) prevents the barrier blade 4 or 5 from rotating for opening or closing in the process of the opening or closing operation of the barrier blades 4 and 5, the barrier springs 6 and 7 permit (absorb) a relief movement of the rotating barrel 2 relative to the barrier blades 4 and 5. In other words, the barrier springs 6 and 7 have the function of absorbing rotation of the rotating barrel 2 when the barrier blade 4 or 5 is prevented from rotating in association with the rotating barrel 2. Accordingly, since no dedicated parts for preventing occurrence of mechanical difficulty are required, cost increases can be prevented. In addition, since the required configuration space for dedicated parts is small, the whole lens barrel can be reduced in size.

Moreover, the first cam grooves 2b and 2c are formed at positions on the inner circumferential surface of the rotating barrel 2 different in depth from the positions of the second cam grooves 2d and 2e (as viewed in a direction perpendicular to the direction of opening or closing of the barrier blades 4 and 5, i.e., as viewed in the optical axis direction). Accordingly, a sufficient angular range of rotation of the rotating barrel 2 (from the lens-barrel retracted position to the telephoto-end position) can be secured.

Second Embodiment

FIGS. 14 to 18 show a barrier device according to a second embodiment of the invention. The mechanical structure of the barrier device of the second embodiment is similar to that of the first embodiment, and the same elements as those shown in the first embodiment are designated in FIGS. 14 to 18 by the same reference characters as in FIGS. 1 to 13. For simplicity, the following discussion in the second embodiment omits the details of the same elements and operations as those in the first embodiment.

Figure 14:
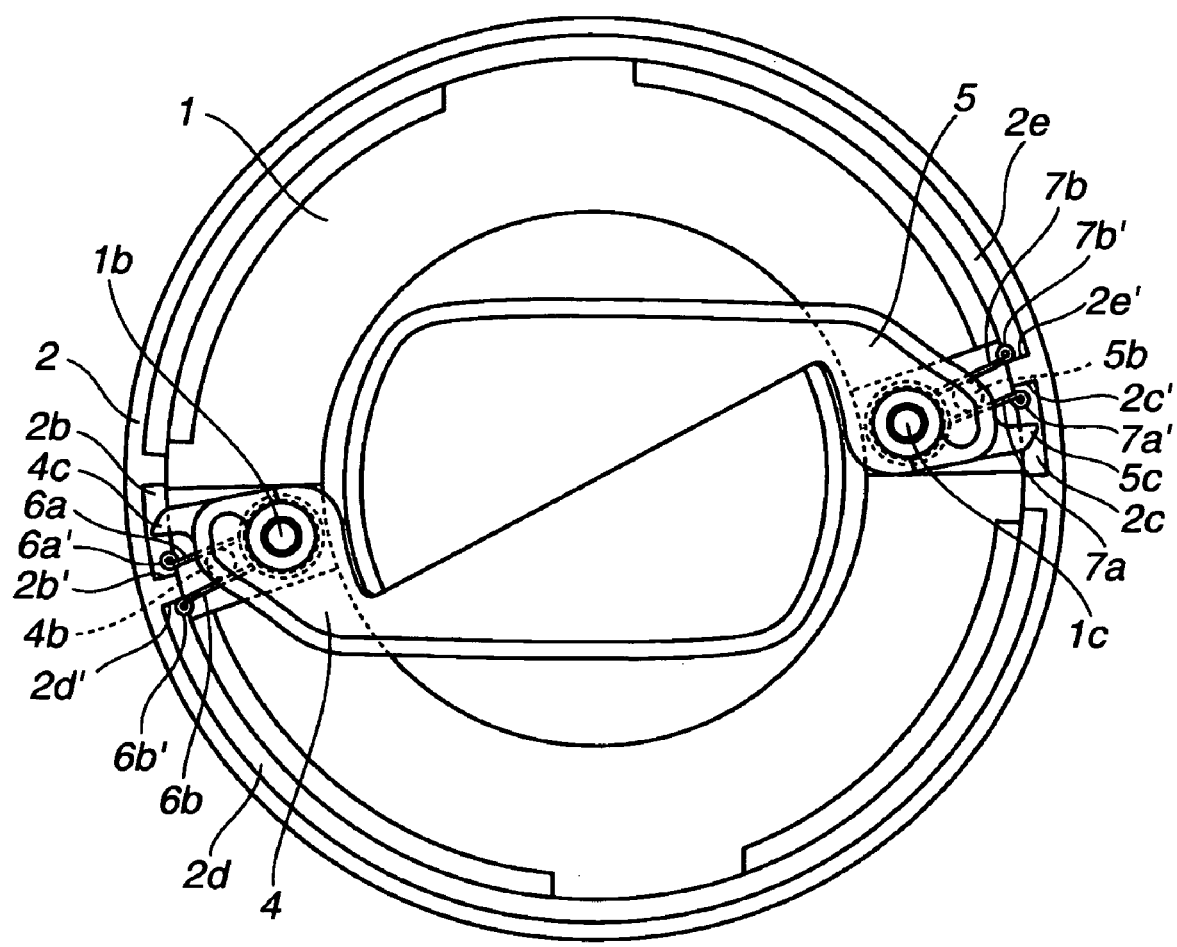
FIG. 14 is a front elevational view of a barrier device according to a second embodiment of the invention with barrier blades in a fully closed state.
Figure 15:
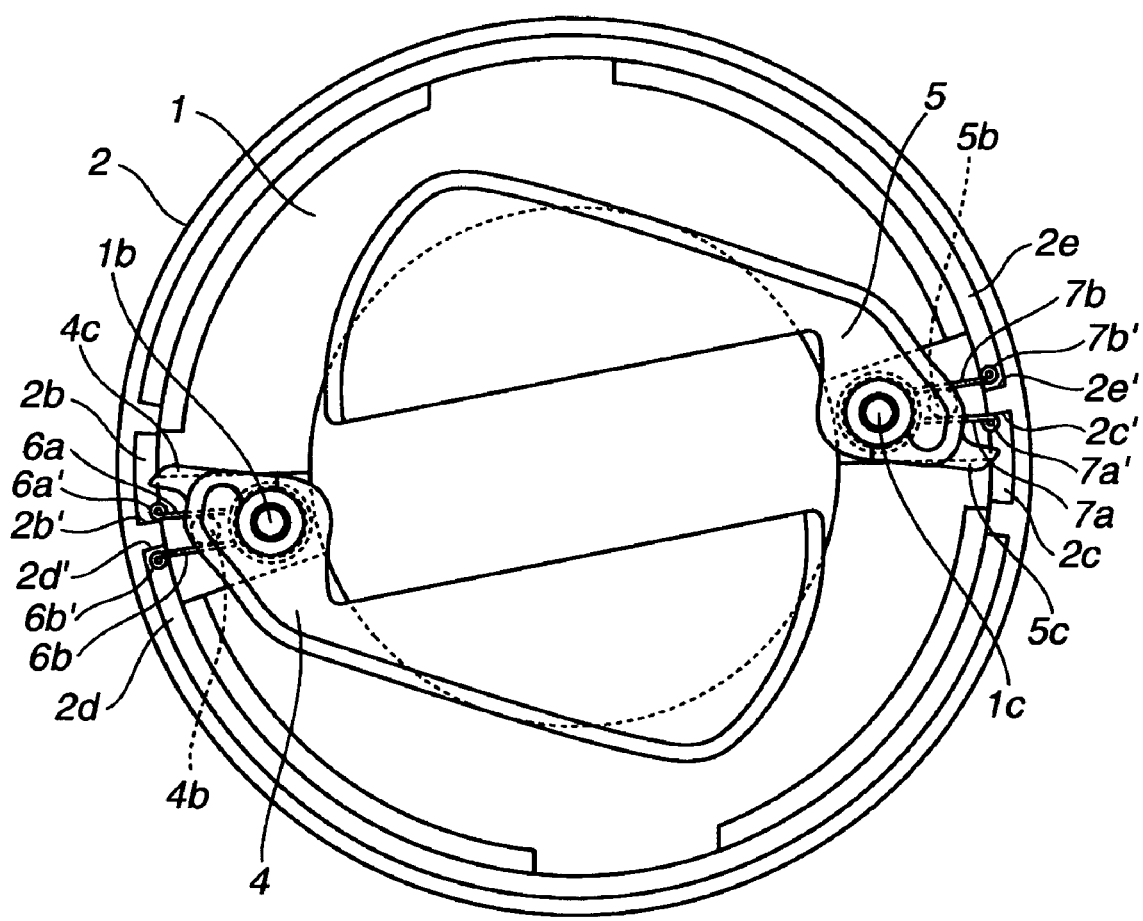
FIG. 15 is a front elevational view of the barrier device in a normal state in the process of opening the barrier blades in the second embodiment of the invention.
Figure 16:
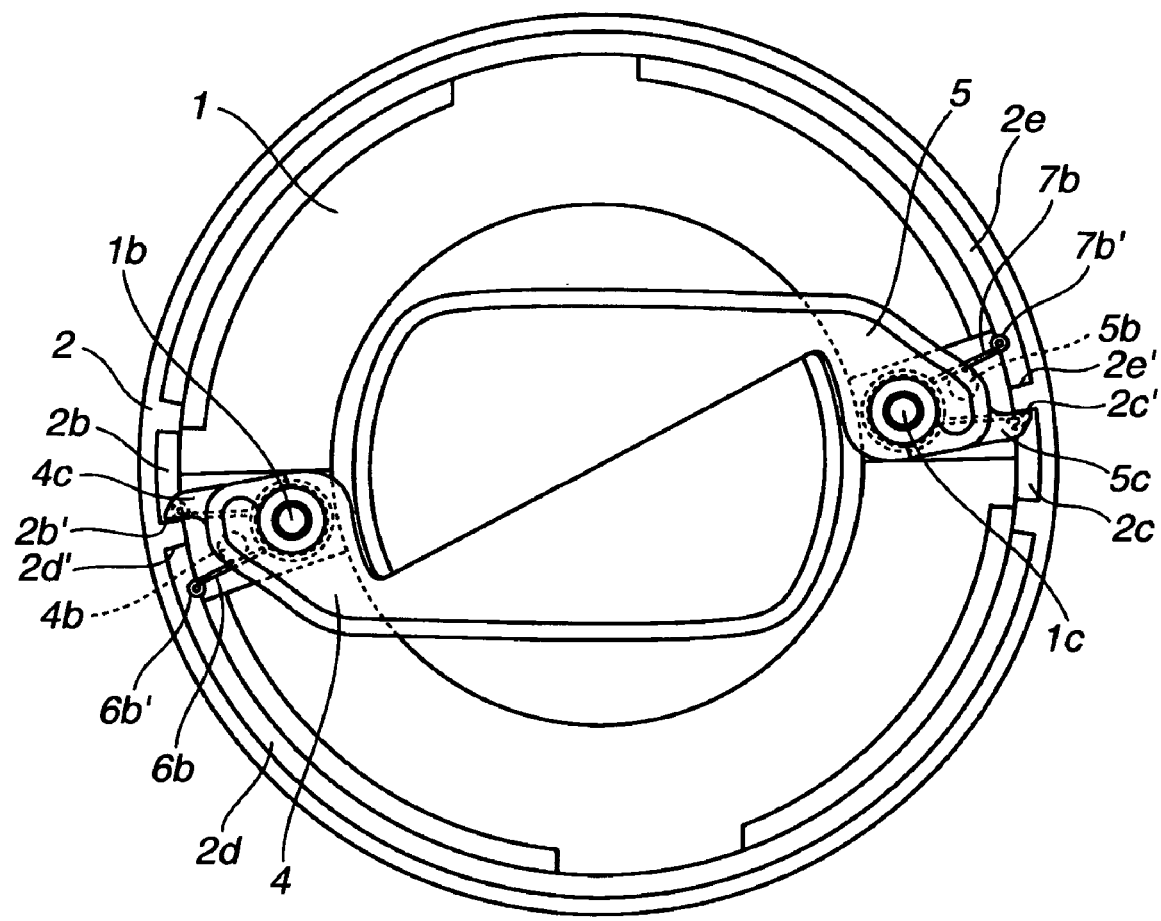
FIG. 16 is a front elevational view of the barrier device with foreign matter such as sand present in a space between a barrier cover and the barrier blade in the state shown in FIG. 14.
Figure 17:
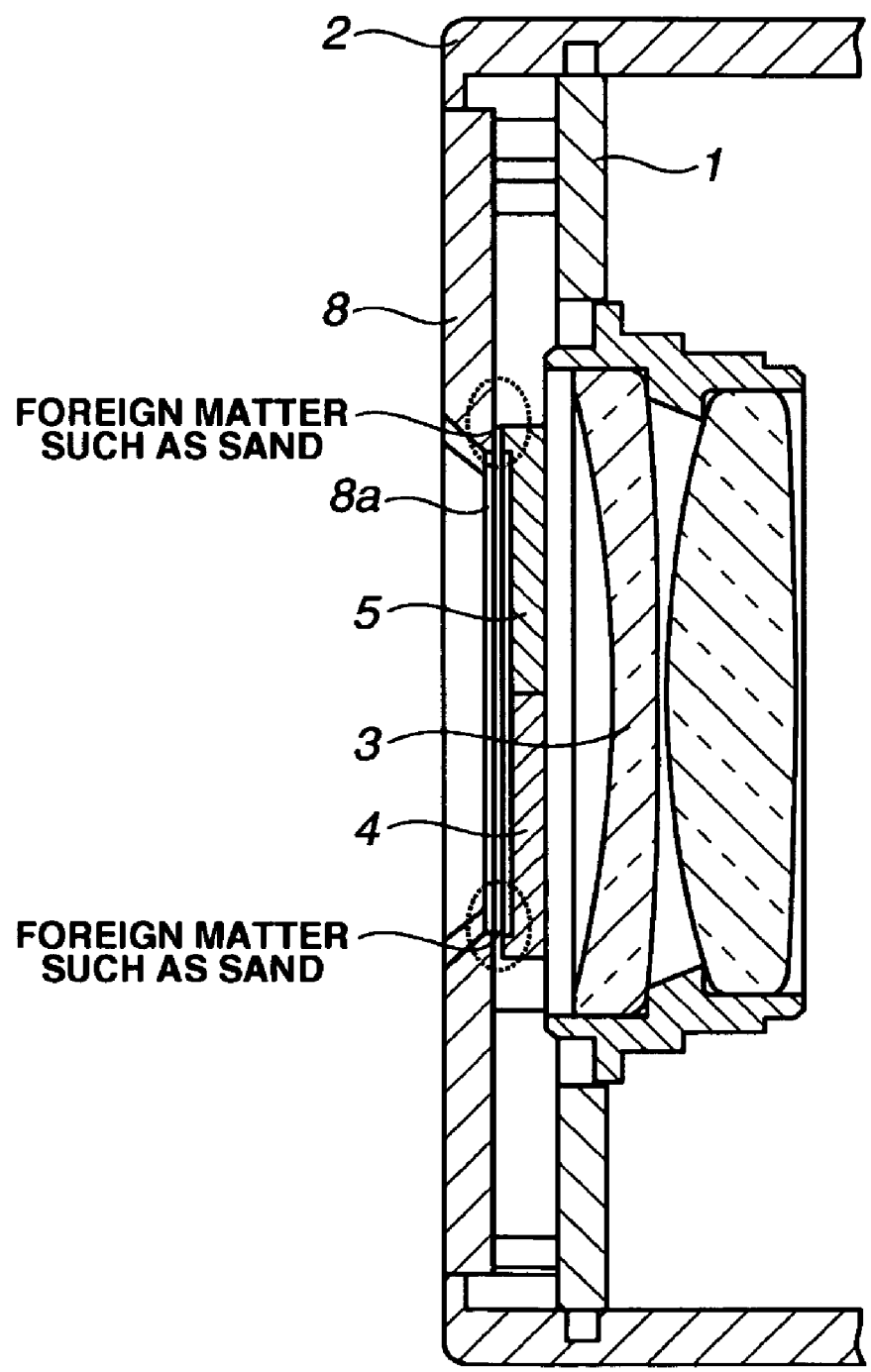
FIG. 17 is a sectional view of the barrier device shown in FIG. 16 with foreign matter such as sand present in the above space in the second embodiment of the invention.
Figure 18:
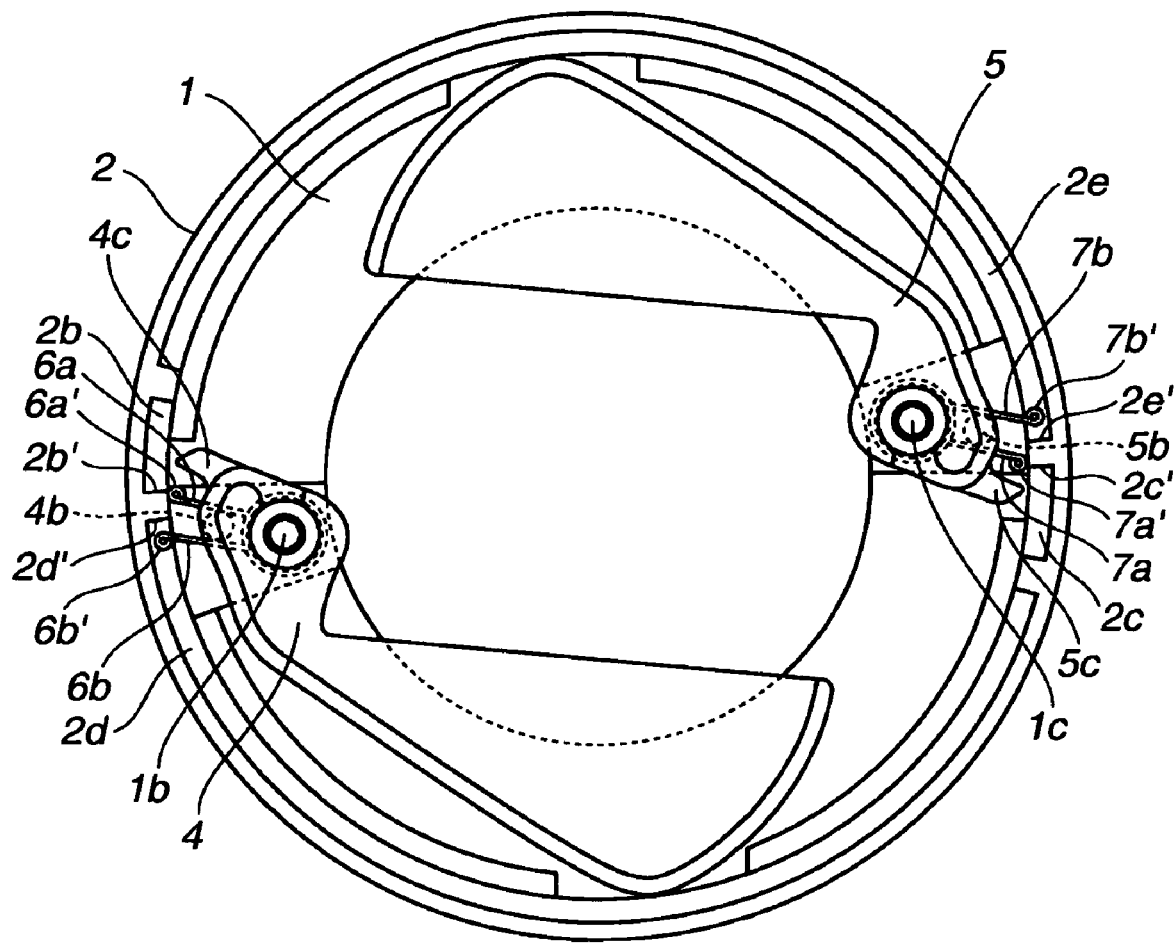
FIG. 18 is a front elevational view of the barrier device with the barrier blades in a fully open state in the second embodiment of the invention.

FIG. 14 is a front elevational view of the barrier device according to the second embodiment with the barrier blades 4 and 5 in a fully closed state. FIG. 15 is a front elevational view of the barrier device in a normal state in the process of opening the barrier blades 4 and 5. FIG. 16 is a front elevational view of the barrier device with foreign matter such as sand present in a space between the barrier cover 8 and the barrier blade 4 or 5 in the state shown in FIG. 14. FIG. 17 is a sectional view of the barrier device shown in FIG. 16 with foreign matter such as sand present in the above space. FIG. 18 is a front elevational view of the barrier device with the barrier blades 4 and 5 in a fully open state.

The structural feature of the second embodiment shown in FIGS. 14 to 18 differs from that of the first embodiment in that the barrier blades 4 and 5 have driving portions 4c and 5c, respectively, integrally formed therewith and extending radially similarly to the barrier springs 6 and 7. The driving portion 4c of the barrier blade 4 is inserted in the first cam groove 2b of the rotating barrel 2, and the driving portion 5c of the barrier blade 5 is inserted in the first cam groove 2c of the rotating barrel 2.

In the case of bringing the barrier blades 4 and 5 from the fully closed state to the fully open state (FIG. 14→FIG. 15→FIG. 18), if foreign matter such as sand is present in a space between the barrier blade 4 or 5 and the barrier cover 8 as shown in FIG. 17 when the barrier blades 4 and 5 are about to be opened by clockwise rotation of the rotating barrel 2 from the state shown in FIG. 14, there is a possibility that the barrier blades 4 and 5 may be prevented from opening, as shown in FIG. 16. The second embodiment is provided to take measures against such a possibility.

In cases where foreign matter such as sand is present in a space between the barrier blade 4 or 5 and the barrier cover 8, as shown in FIG. 17, the clockwise rotation of the rotating barrel 2 causes the end portion 2b' of the first cam groove 2b of the rotating barrel 2 to come into contact with the driving portion 4c of the barrier blade 4 and also causes the end portion 2c' of the first cam groove 2c of the rotating barrel 2 to come into contact with the driving portion 5c of the barrier blade 5, as shown in FIG. 16. Then, this contact causes the rotational force of the rotating barrel 2 to be directly transmitted to the barrier blades 4 and 5. According to this transmission, the barrier blades 4 and 5 are forcibly driven for opening despite the presence of foreign matter. Then, the barrier blades 4 and 5 come into the fully open state as shown in FIG. 18.

While, in the second embodiment, the driving portions 4c and 5c of the barrier blades 4 and 5 are configured to enter the first cam grooves 2b and 2c, respectively, they can be configured to enter the second cam grooves 2*d* and 2*e*, respectively, of the rotating barrel 2.

According to the second embodiment described above, the barrier blades 4 and 5 are respectively provided with the driving portions 4*c* and 5*c* formed integrally therewith. If the barrier blades 4 and 5 are prevented from rotating via the barrier springs 6 and 7 in association with rotation of the rotating barrel 2, the driving portions 4*c* and 5*c* come into direct contact with the rotating barrel 2 to cause the barrier blades 4 and 5 to rotate in association with rotation of the rotating barrel 2. Accordingly, the barrier blades 4 and 5 can be directly driven by the rotating barrel 2, so that, even if foreign matter such as sand is present as mentioned above, the barrier blades 4 and 5 can be reliably opened and closed. Furthermore, since it is not necessary to take a balancing of spring forces into consideration, a load on operation of the lens barrel occurring at the time of the closing operation of the barrier blades 4 and 5 can be reduced.

The advantageous effects of the first and second embodiments are summarized as follows:

(i) A barrier spring (elastic member) is disposed between a barrier blade (barrier member) and a rotating barrel (rotating member) to directly transmit a rotational force of the rotating barrel as an opening or closing force to the barrier blade. Accordingly, the number of dedicated parts for opening and closing the barrier blade can be reduced, and a configuration space for such dedicated parts can be minimized, thereby attaining a reduction in cost and a reduction in space. Therefore, a barrier device can be reduced in size, and a photo-taking apparatus or the like having the barrier device incorporated therein can also be reduced in size.

(ii) The above barrier spring has also the function of absorbing rotation of the rotating barrel (allows a relief movement of the rotating barrel relative to the barrier blade) when the barrier blade is prevented from being moved in association with rotation of the rotating barrel. Accordingly, if the barrier blade is prevented by foreign matter or the like from being moved in association with rotation of the rotating barrel, the barrier spring can absorb rotation of the rotating barrel with its elastic force. Therefore, no dedicated parts for absorbing rotation of the rotating barrel are required, and no configuration space for such parts is required. Thus, the barrier device can be further reduced in size, and the barrier blade can be driven with a relatively small driving load.

(iii) The barrier blade is provided with an action portion (the driving portion 4*c* or 5*c*) formed integrally therewith. If the barrier blade is prevented from being moved via the barrier spring in association with rotation of the rotating barrel, the action portion comes into direct contact with the rotating barrel (enters the first cam groove 2*b* or 2*c*) to cause the barrier blade to move in association with rotation of the rotating barrel. Accordingly, if the barrier blade is prevented from being moved via the barrier spring in association with rotation of the rotating barrel, the action portion of the barrier blade comes into direct contact with the rotating barrel to forcibly cause the barrier blade to move (open and close) in association with rotation of the rotating barrel. Therefore, the barrier blade can be reliably opened and closed.

Furthermore, characteristic configurations of the first and second embodiments described above reside in the following points among others. (A) The elastic member (barrier spring) has two elastic transmission arms that extend radially from a rotational center portion of the barrier blade and that sandwich a protruding portion of the barrier blade. (B) When the barrier device is in the photo-taking ready state (the fully open state shown in FIG. 8), the rotating barrel and the elastic member (barrier spring) are in a non-interlocked state, and, when the barrier device is in the non-photo-taking state (the fully closed state shown in FIG. 4), the rotating barrel and the elastic member are in an interlocked state. (C) The rotating barrel is provided with a driving cam portion for directly driving the elastic member. (D) The driving cam portion is composed of two cam grooves extending in a circumferential direction with respect to each barrier blade. (E) The two cam grooves include a first cam groove (2*b* or 2*c*) for driving the barrier blade in the direction of opening and a second cam groove (2*d* or 2*e*) for driving the barrier blade in the direction of closing. (F) The first cam groove is formed at a position on the inner circumferential surface of the rotating barrel different in height/depth from the position of the second cam groove.

Modification

Although each of the first and second embodiments has been described with reference to an example in which the barrier device has two barrier blades, the barrier device may have only one or three or more barrier blades if there is a sufficient configuration space therefor.

The barrier device according to the invention may be applied not only to various types of photo-taking apparatuses but also to other optical apparatuses, such as interchangeable lenses or focus detecting apparatuses for the photo-taking apparatuses.

The invention has been described in detail with particular reference to certain embodiments thereof, but it will be understood that variations and modifications can be effected within the scope of the invention as described above, and as noted in the appended claims, by a person of ordinary skill in the art without departing from the scope of the invention.

What is claimed is:

1. A barrier device comprising:
    a rotating barrel having an opening and an inner circumferential surface, wherein the rotating barrel is rotatable about an axis;
    a barrier member movably positioned about the opening of the rotating barrel; and
    an elastic member supported by the barrier member and coupled to the rotating barrel so as to transmit a rotational force of the rotating barrel to the barrier member to move the barrier member between a first position and a second position,
    wherein the barrier member includes a protruding portion, the rotating barrel includes first and second cam portions formed on the inner circumferential surface thereof, and the elastic member includes first and second elastic transmission arms sandwiching the protruding portion therebetween and extending toward the rotating barrel, wherein the first and second transmission arms are capable of engaging with and disengaging from the first and second cam portions respectively.

2. A barrier device according to claim 1, wherein as the rotating barrel rotates in a first direction, the first elastic transmission arm contacts the first cam portion to transmit the rotational force of the rotating barrel to the barrier member so as to move the barrier member from the first position to the second position, and as the rotating barrel rotates in a second direction, the second elastic transmission arm contacts the second cam portion to transmit the rotational force of the rotating barrel to the barrier member so as to move the barrier member from the second position to the first position.

3. A barrier device according to claim 1, wherein the first and second cam portions include grooves defined on the circumferential surface of the rotating barrel at different depths relative to the opening.

4. A barrier device according to claim 1, wherein the protruding portion is capable of moving the first and second transmission arms apart from each other to produce an elastic force urging the first and second elastic transmission arms together to move the barrier member.

5. A barrier device according to claim 1, wherein the barrier member includes an action portion, and wherein as the rotating barrel rotates, the action portion contacts at least one of the first and second cam portions to move the barrier member.

6. An apparatus comprising:

(A) an optical system;

(B) a barrier device including:

a rotating barrel having an opening and an inner circumferential surface, wherein the rotating barrel is rotatable about an axis;

a barrier member movably positioned about the opening of the rotating barrel; and an elastic member supported by the barrier member and coupled to the rotating barrel so as to transmit a rotational force of the rotating barrel to the barrier member to move the barrier member between a first position and a second position, wherein the barrier member includes a protruding portion, the rotating barrel includes first and second cam portions formed on the inner circumferential surface thereof, and the elastic member includes first and second elastic transmission and sandwiching the protruding portion therebetween and extending toward the rotating barrel, and wherein the first and second transmission arms are capable of engaging with and disengaging from the first and second cam portions respectively; and (C) a non-rotatable barrel fitted into the inner circumferential surface of the rotating barrel, wherein the non-rotatable barrel includes a shaft portion movably supporting the barrier member about the opening of the rotating barrel, and wherein the non-rotatable barrel supports the optical system at about the opening of the rotating barrel.

7. An apparatus according to claim 6, it wherein as the rotating barrel rotates in a first direction, the first elastic transmission arm contacts the first cam portion to transmit the rotational force of the rotating barrel to the barrier member so as to move the barrier member from the first position to the second position, and as the rotating barrel rotates in a second direction, the second elastic transmission arm contacts the second cam portion to transmit the driving force of the rotating barrel to the barrier member so as to move the barrier member from the second position to the first position.

8. An apparatus according to claim 6, wherein the protruding portion is capable of moving the first and second elastic transmission arms apart from each other to produce an elastic force urging the first and second elastic transmission arms together to move the barrier member.

9. An apparatus according to claim 6, wherein the barrier member includes an action portion, wherein as the rotating barrel rotates, the action portion contacts at least one of the first and second cam portions to move the barrier member.

* * * * *